Figure 1:
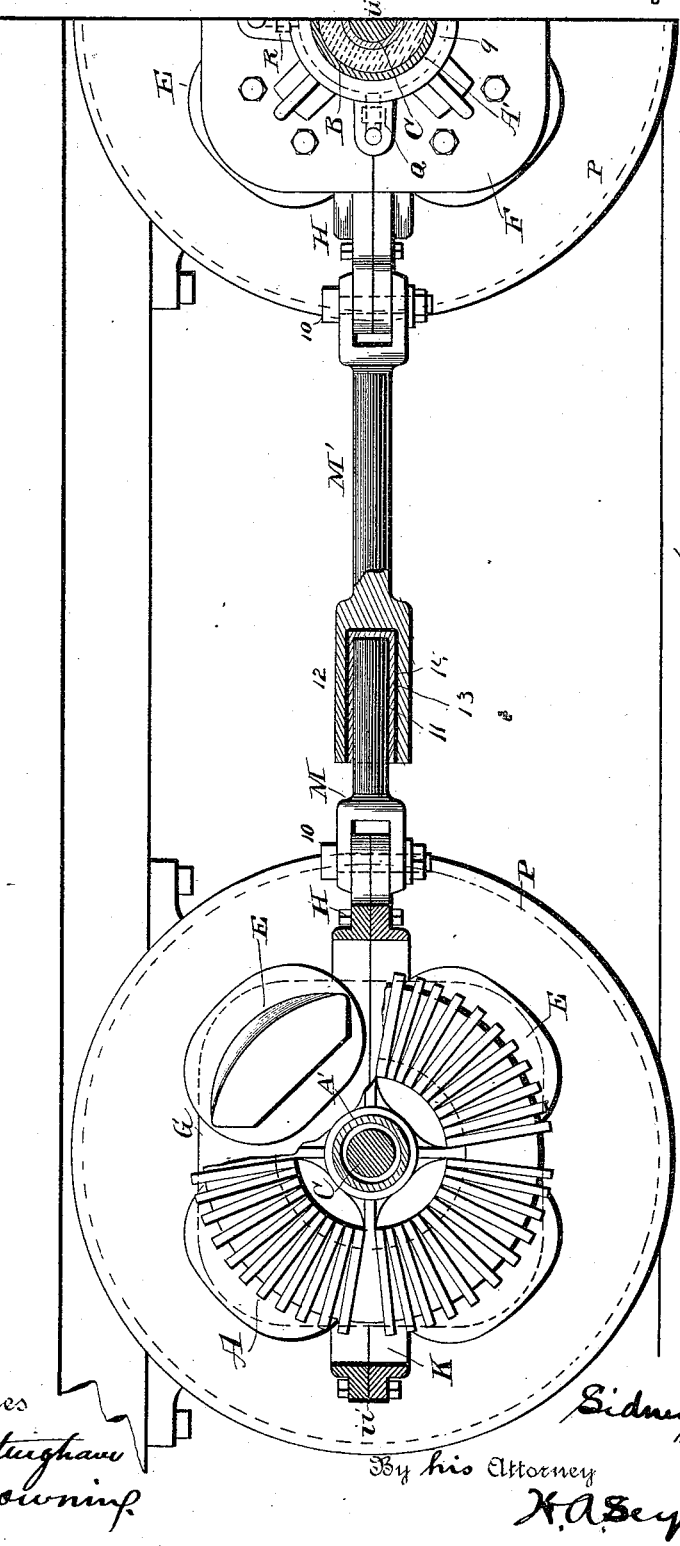

(No Model.) 5 Sheets—Sheet 2.
S. H. SHORT.
MOTOR CAR FOR ELECTRIC RAILWAYS.
No. 452,035. Patented May 12, 1891.
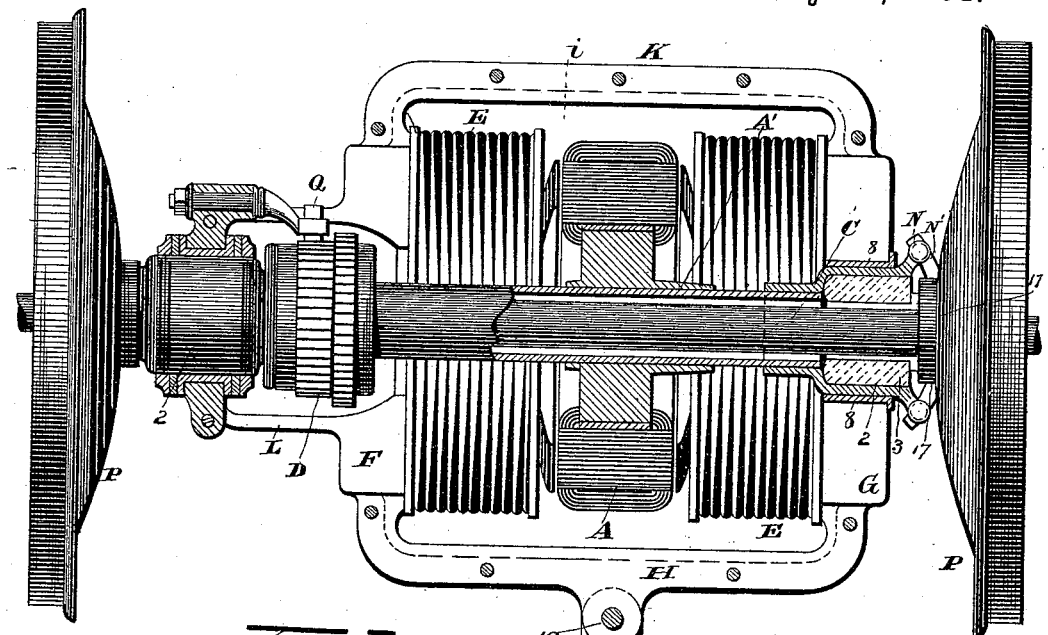
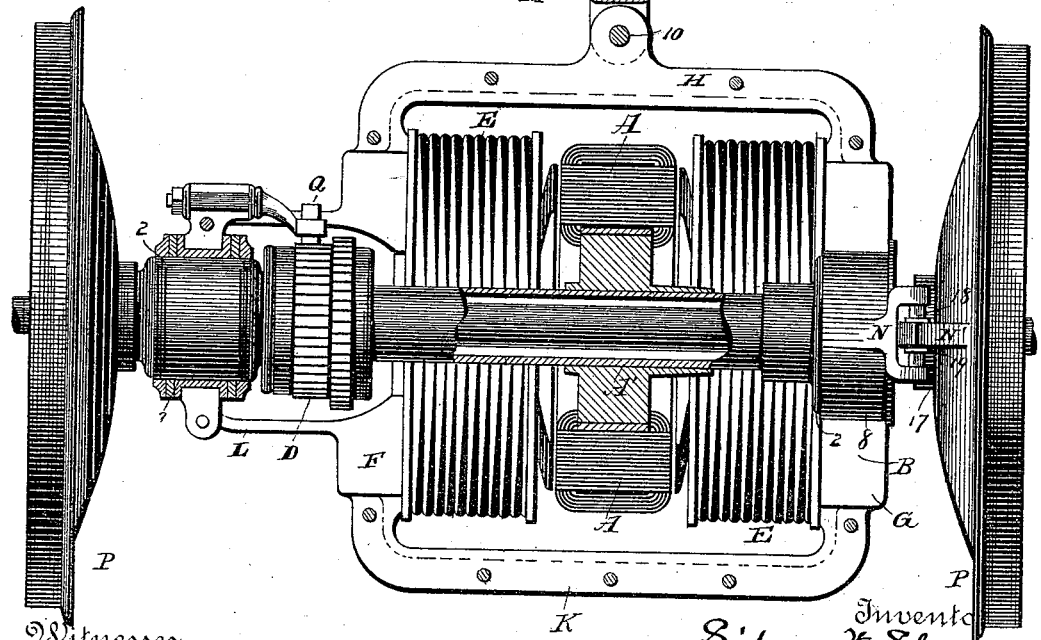
Fig. 2.
Witnesses
E. N. Hillingham
G. F. Downing.
Inventor
Sidney H. Short
By his Attorney
H. A. Seymour

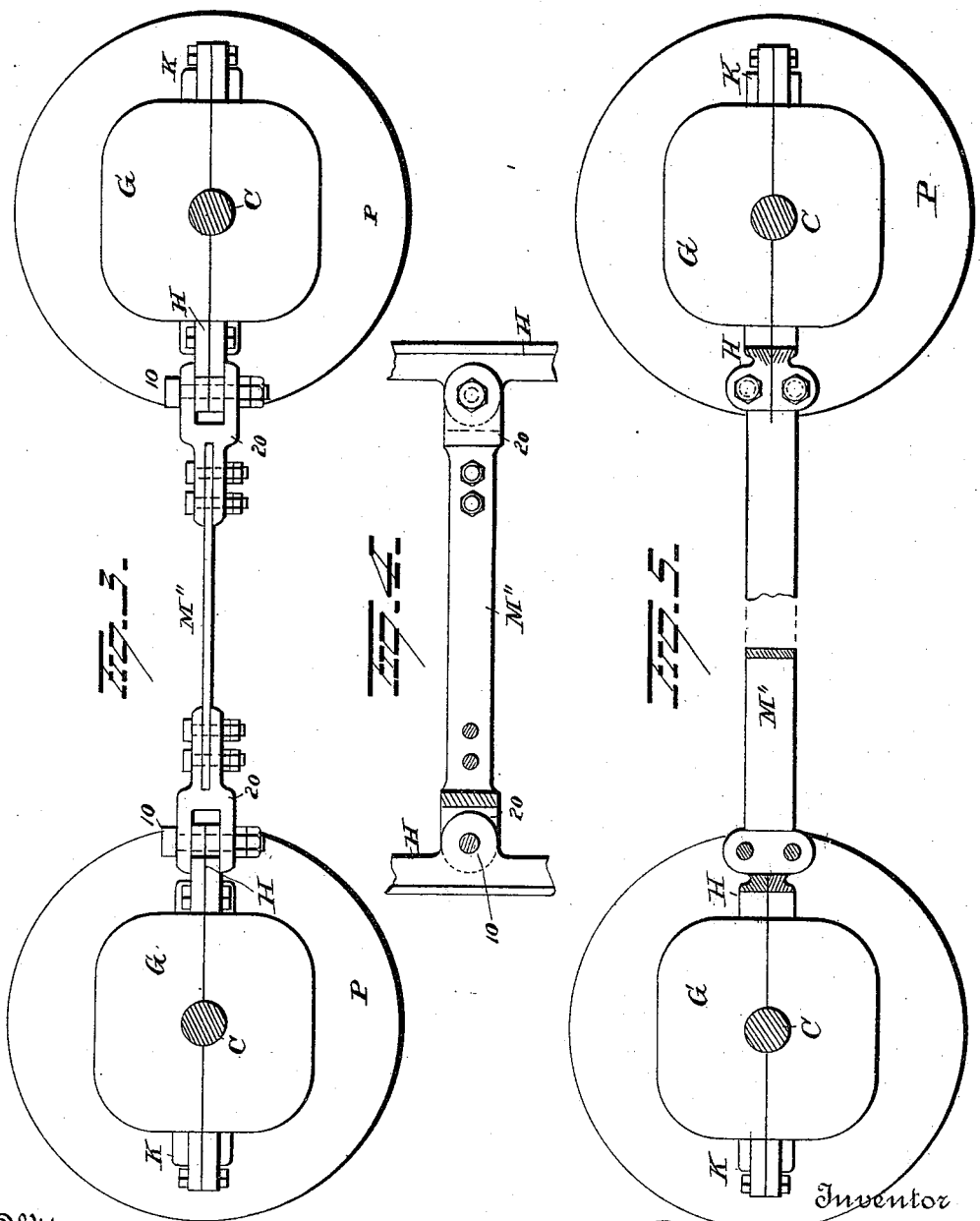

(No Model.) 5 Sheets—Sheet 4.
S. H. SHORT.
MOTOR CAR FOR ELECTRIC RAILWAYS.
No. 452,035. Patented May 12, 1891.
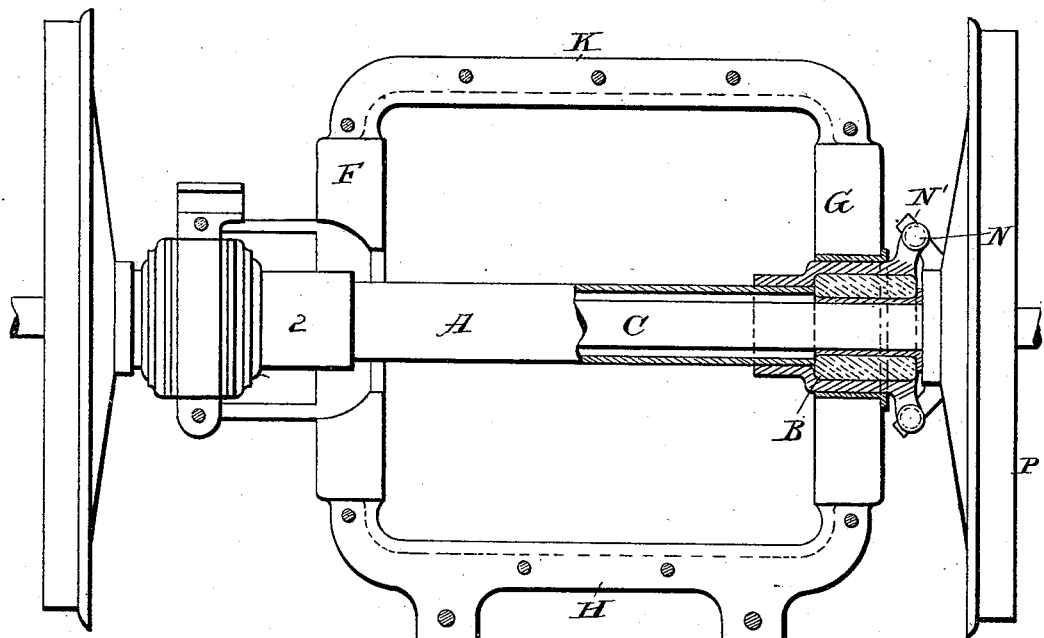
Fig. 6.
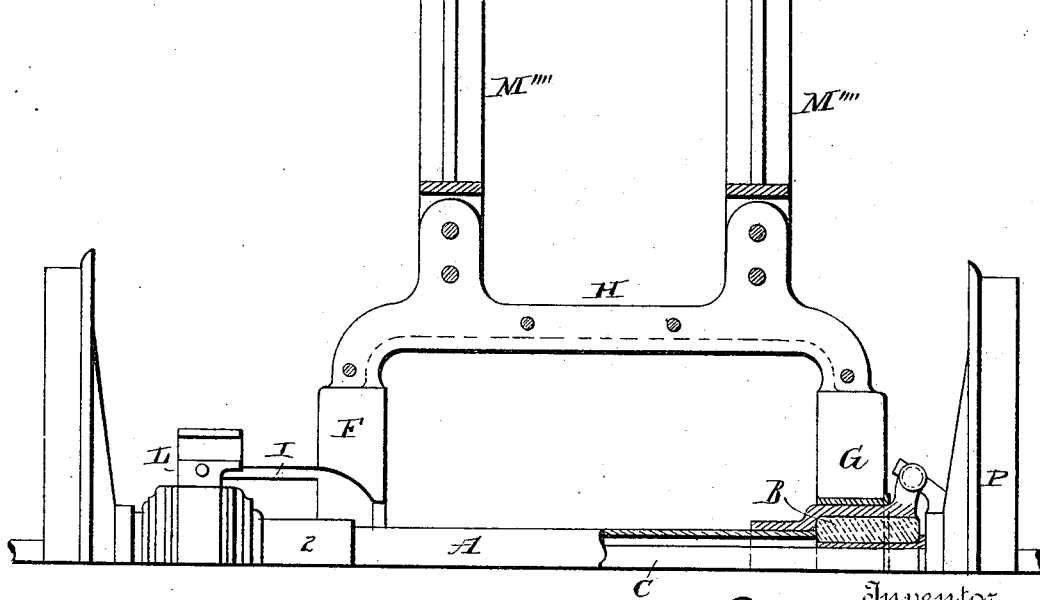
Witnesses
E. J. Nottingham
G. F. Downing
Inventor
Sidney H. Short
By his Attorney
H. A. Seymour
THE NORRIS PETERS CO., PHOTO-LITHO., WASHINGTON, D. C.

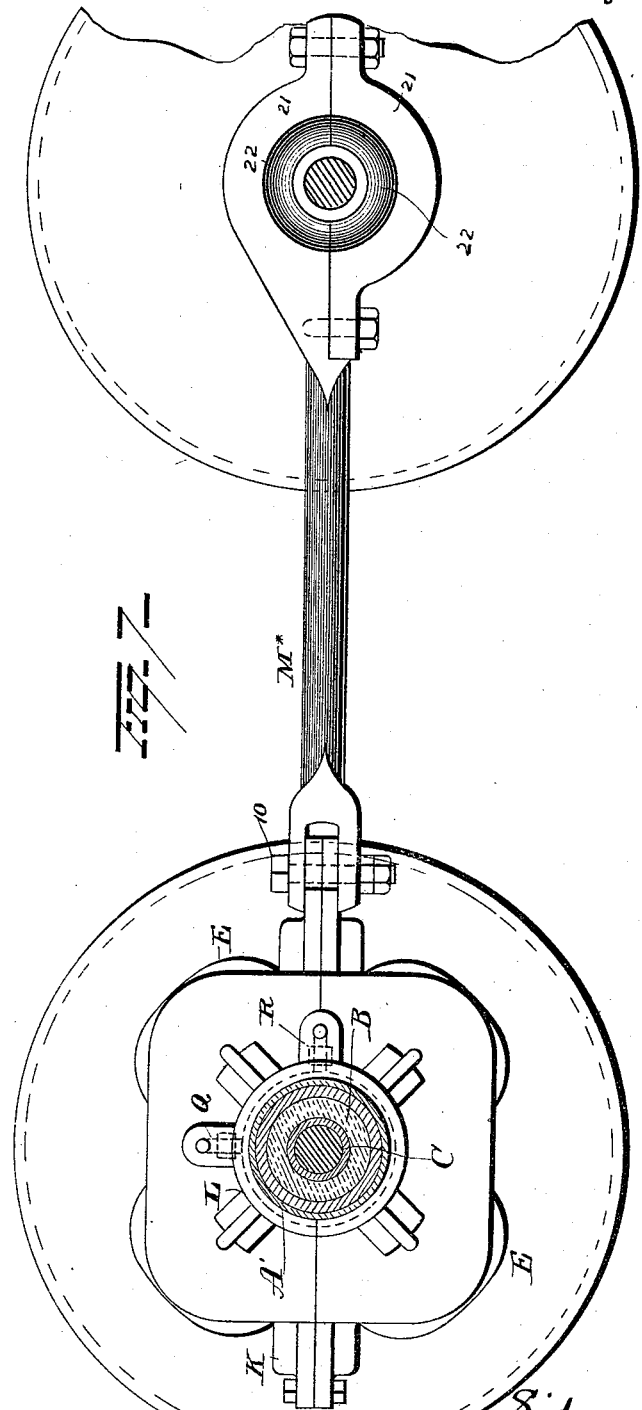

UNITED STATES PATENT OFFICE.

SIDNEY H. SHORT, OF CLEVELAND, OHIO, ASSIGNOR TO THE SHORT ELECTRIC RAILWAY COMPANY, OF SAME PLACE.

MOTOR-CAR FOR ELECTRIC RAILWAYS.

SPECIFICATION forming part of Letters Patent No. 452,035, dated May 12, 1891.

Application filed November 26, 1890. Serial No. 372,727. (No model.)

*To all whom it may concern:*

Be it known that I, SIDNEY H. SHORT, of Cleveland, in the county of Cuyahoga and State of Ohio, have invented certain new and useful Improvements in Motor-Cars for Electric Railways; and I do hereby declare the following to be a full, clear, and exact description of the invention, such as will enable others skilled in the art to which it appertains to make and use the same.

This invention relates more particularly to electrically-propelled cars having a propelling-motor for each axle; but it is partly applicable to single-motor cars. It has special reference to motor-cars in which a propelling-motor mounted on a driving-axle has its axially-placed armature connected directly with the driving-axle, so as to revolve therewith at equal speed. By "axially placed" is to be understood that the axes of the armature and driving-axle are coincident, or nearly so.

In accordance with the present invention the axially-mounted and directly-connected armature is combined with field-magnets mounted on the driving-axle by means of journal-bearings and held from rotation by a connection with the other axle of the car. Preferably a spring-mounting is provided on the car-axle for the propelling-motor, so that the motor is less exposed to the jolting of the car. Such spring-mounting may most conveniently be made by a hollow shaft which carries the motor and surrounding said axle with springs or buffers interposed, the hollow shaft and springs turning with the axle and armature. Preferably, also, the motor is insulated from the car-axle by said springs or buffers being made of rubber or by other means, so that the iron of the motor is not connected electrically with the ground through the mounting. With the spring-mounted motor the direct driving connection or coupling, through which the armature imparts motion to the car-axle, is adapted to conform to the movements of the motor on springs or buffers. The connection with the other car-axle, by which the field-magnets are held from rotation, may be rigid or flexible, a connection made flexible by joints or otherwise (as by the use of one or more naturally-flexible pieces) being desirable in order to allow the car-axles to adjust themselves to curves and other irregularities in the road-bed and to avoid unnecessary stress on the propelling machinery. It is preferred to make the connection under consideration flexible about vertical axes, (as by two upright hinged joints,) and also about a horizontal longitudinal axis, (that is capable of torsional movement,) so as to adapt said connection to yield to all sorts of movements while still adapted to hold the field-magnets from rotating; but the invention is not restricted to this precise form of a flexible connection.

In a car with a motor for each axle the motors may each be separately connected with the other axle of the car, as would be the case of a car with a motor for one axle only; but the same connection may be made to serve for the motors of both axles of a car, the motor of each axle being thus connected with the other axle through the connection of the other motor. This arrangement is specially included in the invention, and the rigid or the more or less flexible connection, as above set forth, may be employed with it. So, also, one or both of the two connected motors may be spring-mounted, or they may both be mounted rigidly on the car-axle, except so far as is necessary to allow the axle to turn relatively to the field-magnets.

This invention extends to a directly-connected motor of any known or suitable form mounted upon a driving-axle; but a motor having the field-magnets at the sides of the armature, and particularly a multipolar motor of this description, has special advantages for this use, because the field-magnets can be made comparatively large and be multiplied in number without encroaching upon the space under the armature between it and the ground, and consequently the armature can be made as large, or nearly so, as the space between the car-axle admits, while leaving sufficient space for it to clear the ground or any object likely to be found on the road-bed. A further advantage of this arrangement of field-magnets is that they balance themselves on the axle and do not therefore bring their weight on the connection with the other axle.

Although the present invention has special reference to a motor which is axially mounted on a driving-axle and is directly connected therewith, nevertheless, inasmuch as a connection such as above described has never, so far as I am aware, been employed with a motor mounted axially or otherwise on a driving-axle and connected therewith by reducing gear or otherwise, and as said invention admits of use with a motor imparting motion to the axle through reducing-gear, the invention extends to the combination of said connection with motors in general mounted on car-axles, as well as with axially-mounted motors having direct driving connections with said axles.

In the accompanying drawings, which form part of this specification, Figure 1 is a partial view in longitudinal section on line $i$ of Fig. 2 of a double motor car constructed in accordance with the invention. Fig. 2 is a longitudinal section on line $i\,i$ of Fig. 1, partly in the plan. Fig. 3 is a partial view in sectional elevation; and Fig. 4, a partial view in horizontal section and plan, illustrating another form of a flexible connection. Fig. 5 is a partial view in sectional elevation illustrating an additional form of a flexible connection. Fig. 6 is a sectional plan view illustrating a rigid connection, and Fig. 7 is a partial view in sectional elevation illustrating a single-motor car or a propelling-motor mounted on one axle of the car and connected with the other axle independent of a motor thereon.

Referring to Figs. 1 and 2, there is a propelling-motor for each axle, the armature A of such motor being fast on a hollow shaft A', which surrounds the car-axle C, and is supported on springs B of, say, soft vulcanized rubber, interposed between the walls of sockets or enlargements 2 on said shaft and the car-axle. The commutator D is also fast on the hollow shaft A'. The field-magnets E project from the yokes F and G at the sides of the armature A, which latter is composed of a soft-iron strip wound upon itself and provided with bobbins in notches in the edges. The yokes are connected by arms H and K, and the yoke F has a bracket L. The field-magnets are mounted on the hollow armature-shaft A', so that the springs B support them also. The field-magnets are provided with journal-bearings at 8 and 9, by which they are supported on said hollow shaft A'. They are held from rotation by means of a connection with the other axle. This connection, as shown in Figs. 1 and 2, is made through the motor on the other axle and comprising a rod in two parts M M'. Each part of the rod is jointed by a vertical hinge-joint at 10 to the arm H of the corresponding motor, and they are jointed together by a torsional joint, the end of the part M constituting a pin 11, which is journaled in a socket 12 on the end of the part M'. In order to insulate the motors from each other, a metal cup 13 is placed in the socket 12, with insulating material 14 between. This insulating material may be omitted and the motors will still be insulated from the wheel-base by way of the mounting; but the insulation is desirable, because if one of the motors should become accidentally grounded the other motor will be protected by the insulation in the connection M M'. Instead of making the bar M M' in two parts, it could be made integral by omitting the torsion-joint in the middle and would still be a connection flexible on vertical axes—namely, at the joints 10.

The direct driving connection for the armature in Figs. 1 and 2 consists of a self-adjusting coupling formed by forks N on the armature-shaft A' and arms N' on the collar 17, which is fast on the hub of a driving-wheel P. Between the arms N' and the forks N are spring-pads 18, preferably of rubber, so as to insulate the forks from the arms, and thus complete the insulation of the motor from the ground. The coupling N N' 18, it will be observed, is self-adjusting for all movements of the armature-shaft A', the play of the arms N' between the pads 18 permitting movements of the armature and field-magnets in the direction of said arms N' and the yielding of the spring-pads 18 permitting transverse movements. The ends of the spring-pads 18 are protected by metal caps 19, which prevent the arms N' rubbing against the material composing the pads. At Q and R are the commutator-brushes.

In Figs. 3 and 4 the bar M'' is flat and of spring metal and admits of a torsional movement by reason of its flexibility. It is provided with forks 20 at the ends, which are bolted to the bar M'' and connected by a vertical hinge-joint 10 with an arm H belonging to the field-magnets of each motor.

In Fig. 5 a flat spring-bar M''' is placed in a vertical position and bolted to ears on the arms H of the field-magnets of the motor. It is flexible about vertical axes by bending, as well as about a horizontal longitudinal axis by twisting.

In Fig. 6 the connection M'''' is rigid, being bolted to the arms H of the two motors.

In Fig. 7 the motor is mounted on one axle and the field-magnets are connected with the other axle not through a second motor, as in preceding figures, but directly. The connection consists of a bar M*, provided with a vertical hinge 10 where it joins the arm H of the motor and a ball-and-socket joint where it is attached to the other axle. The split socket 21 on the end of the bar M* incloses the split ball 22 on the car-axle.

The motors have been described as mounted on the driving-axles through the medium of the springs B; but a connection of each of the several forms shown may be used for motors mounted on the car-axle without any interposition of springs. In Figs. 3 and 4 the hollow shaft A', with its springs and appendages, has been omitted, the armature A being mounted rigidly (as by a key) on the car-axle C and the journals for upholding the field-magnets being formed by parts of said axle.

The motors shown have cross-connected armatures and multipolar field-magnets, such motors being specially adapted to use with an axial mounting and direct connection, as shown. Two pole-motors might, however, be used. It is evident that, instead of having the armature rotate, this might be held from rotation, as described, for the field-magnets and the latter be allowed to turn with the car-axle, as described, for the armature, and it will be understood that this reverse arrangement is included in the invention as a substitute for that particularly described without further specification herein. Moreover, it is possible to replace the directly-connected motor by a geared motor, it only being necessary to mount the motor-frame and a driving-gear on the axle C directly or through the intermediary of the hollow shaft A' and springs B, as before described, for the field-magnets and armature, respectively. Although a number of forms of connection for motors mounted on car-axles have been described, it is not to be understood that these exhaust the modifications of which the invention is capable; but they are given by way of fuller illustration or more complete example than a single form would furnish.

Having fully described my invention, what I claim as new, and desire to secure by Letters Patent, is—

1. The combination, with a car and an electric propelling-motor comprising a directly-connected armature mounted on a driving-axle and field-magnets directly journaled on said axle, of a connection with another car-axle, whereby said magnets are held from rotating, substantially as described.

2. The combination, with a car and an electric propelling-motor comprising a directly-connected armature mounted on a driving-axle and field-magnets journaled on said axle, of a flexible connection with another car-axle, whereby said magnets are held from rotating, substantially as described.

3. The combination, with a car and an electric propelling-motor comprising a directly-connected armature mounted on a driving-axle and field-magnets journaled on said axle, of a connection flexible about vertical axes between said field-magnets and another car-axle, substantially as described.

4. The combination, with a car and an electric propelling-motor comprising a directly-connected armature mounted on a driving-axle and field-magnets mounted on said axle by means of journal-bearings, of a connection capable of a torsional movement between said field-magnets and another car-axle, substantially as described.

5. The combination, with a car and an electric propelling-motor comprising a directly-connected armature mounted on a driving-axle and field-magnets journaled on said axle, of a connection flexible about vertical axes and capable also of a torsional movement between said field-magnets and another car-axle, substantially as described.

6. The combination, with a car, of an electric propelling-motor on each of two car-axles, comprising a directly-connected armature and field-magnets directly journaled on said axle, and a connection between the field-magnets of said motors, substantially as described.

7. The combination, with a car, of a propelling-motor on each of two car-axles, comprising a directly-connected armature and field-magnets journaled on said axle, and a flexible connection between the field-magnets of the said motors, substantially as described.

8. The combination, with a car, of a propelling-motor on each of two car-axles, comprising a directly-connected armature and field-magnets journaled on said axle, and a connection flexible about vertical axes between the said field-magnets of the two motors, substantially as described.

9. The combination, with a car, of a propelling-motor on each of two car-axles, comprising a directly-connected armature and field-magnets mounted on the axle by journal-bearings, and a connection capable of torsional movement between the field-magnets of the said motors, substantially as described.

10. The combination, with a car, of a propelling-motor on each of two car-axles, comprising a directly-connected armature and field-magnets journaled on said axle, and a connection flexible about vertical axes and capable also of torsional movement between the field-magnets of the said motors, substantially as described.

11. The combination, with a car and a spring-mounted electric propelling-motor comprising a directly-connected armature mounted on a driving-axle and field-magnets directly journaled on said axle, of a connection between said field-magnets and another car-axle, substantially as described.

12. The combination, with a car, of two propelling-motors, one at least being spring-mounted, and each comprising an armature directly connected and mounted on a driving-axle and field-magnets directly journaled on said axle, and a connection between the field-magnets on the two axles, substantially as described.

13. The combination, with a car, of two propelling-motors, one on each axle, each motor comprising a directly-connected armature mounted on a driving-axle and field-magnets directly journaled on said axle and each being insulated from its axle by way of the mounting and driving connection, and a connection between the field-magnets of said motors, substantially as described.

14. The combination, with a car, of two propelling-motors, one on each axle, each motor comprising a directly-connected armature mounted on a driving-axle and field-magnets mounted on said axle by means of journal-bearings and each being insulated from its axle by way of the mounting and driving connection, and an insulating connection between the field-magnets of said motors, substantially as described.

15. The combination, with a car, of a hollow shaft on each axle, springs between said shaft and axle, a directly-connected armature on said shaft, field-magnets journaled on said shaft, and a connection between the field-magnets on the two axles, substantially as described.

16. The combination, with a car, of an electric propelling-motor comprising a directly-connected armature mounted on a driving-axle and two pole or multipolar field-magnets directly journaled upon and symmetrically arranged about the axle at the sides of the armature, and a connection between said field-magnets and another car-axle, substantially as described.

17. The combination, with a car, of two electric propelling-motors, one on each axle, comprising a directly-connected armature mounted on a driving-axle and double-pole or multipolar field-magnets directly journaled upon and symmetrically arranged about the axle at the sides of the armature, and a connection between the field-magnets of said motors, substantially as described.

18. The combination, with a car, of an electric propelling-motor mounted on a driving-axle, and a connection capable of torsional movement between said motor and another car-axle, substantially as described.

19. The combination, with a car, of an electric propelling-motor mounted on a driving-axle, and a connection flexible about vertical axes and capable also of a torsional movement between said motor and another car-axle, substantially as described.

20. The combination, with a car, of two propelling-motors, one mounted on each axle, and a connection capable of torsional movement between the two motors, substantially as described.

21. The combination, with a car, of two propelling-motors, one mounted on each axle, and a connection flexible about vertical axes and capable also of torsional movement between the motors, substantially as described.

22. The combination, with a car, of a propelling-motor mounted on a driving-axle, with springs interposed, and a connection between said motor and another car-axle, substantially as described.

23. The combination, with a car, of two electric propelling-motors mounted each on a car-axle, with springs interposed, and a connection between said motors, substantially as described.

24. The combination, with a car, of two electric propelling-motors, each directly mounted on a car-axle and insulated therefrom by way of the mounting and driving connection, and a connection between said motors, substantially as described.

25. The combination, with a car, of two electric propelling-motors mounted each on a car-axle and insulated therefrom by way of the mounting and driving connection, and an insulating connection between said motors, substantially as described.

26. The combination, with a car, of a hollow shaft on each axle, springs between said shaft and axle, a propelling-motor mounted on said shaft, and a connection between the two motors, substantially as described.

In testimony whereof I have signed this specification in the presence of two subscribing witnesses.

S. H. SHORT.

Witnesses:
A. B. CALHOUN,
C. W. PHIPPS.